United States Patent Office 3,244,654
Patented Apr. 5, 1966

3,244,654
CONDENSATION PRODUCTS FROM AN AROMATIC COMPOUND AND A CHLORINATED MIXTURE OF A PARAFFIN HYDROCARBON AND A POLYOLEFIN AND PROCESS FOR THEIR MANUFACTURE
Josef Kaupp, Helmut Klug, Richard Bollinger, and Heinz Eckhardt, Gersthofen, near Augsburg, Germany, assignors to Farbwerke Hoechst Aktiengesellschaft vormals Meister Lucius & Bruning, Frankfurt am Main, Germany, a corporation of Germany
No Drawing. Filed Mar. 10, 1960, Ser. No. 14,005
Claims priority, application Germany, Mar. 13, 1959, F 27,943; July 25, 1959, F 29,014
15 Claims. (Cl. 260—28.5)

The present invention relates to condensation products and a process for making them by reacting chlorinated mixtures of paraffin hydrocarbons and polyolefins with aromatic hydrocarbons and/or phenols. The invention also relates to the use of the phenol condensation products so obtained as additives in the manufacture of phenol aldehyde resins.

The manufacture of condensation products from paraffins and aromatic substances, for example according to the Friedel-Crafts method, has long been known. It has also been described to produce such products from long-chain paraffins by condensation with aromatic substances. The consistency of those products depends on the molecular weight so that, depending on the degree of cross-linking, the compounds obtained from paraffins of low molecular weight constitute thin to highly viscous oils and those from paraffins of high molecular weight are ductile to hard products. It has been stated in the literature that both classes of compounds are suitable for a number of special applications, for example as high-pressure lubricants, agents for lowering the solidification point or as base materials for lacquers and varnishes.

Articles made from the known phenol resins have the disadvantage of being very sensitive to impact or pressure. Numerous attempts have therefore been made to render these resins elastic in order to obtain articles that are more resistant to mechanical stress. As substances that improve the elasticity of the said resins and which are subsequently admixed with the resins prior to setting there have been proposed, for example, copolymers based on butadiene/acrylonitrile compounds or protein/formaldehyde compounds, for instance those based on glue or gelatin. It is also known to produce similar effects by adding alkylphenols of relatively low molecular weight to the phenol resins. By the addition of the aforesaid products, the mechanical properties of phenol aldehyde resins could not, however, be improved to a satisfactory degree.

Now we have found that especially valuable products can be obtained by the analogous reaction of chlorination products obtained by the simultaneous chlorination of paraffin hydrocarbons and polyolefins, for example those obtained by the process of U.S. patent application Ser. No. 615,748 filed on Oct. 15, 1956, now U.S. Patent No. 2,959,562. The products obtained by the process of the invention are distinguished by a good stiffness in flexure, tear resistance, flexural strength and torsion. They differ in that respect considerably from the aforesaid products as is evident, for example, from the table of Example 1.

It is noteworthy that even compounds that have been prepared with the addition of relatively small quantities of polyolefin, for example 2 to 10% by weight of polyolefin calculated on the paraffin component, possess considerably improved properties. This is the more surprising since the condensation products obtained from chlorinated polyolefins and aromatic substances in the absence of paraffin hydrocarbons are only soft products, which is obviously due to a substantial molecule decomposition of the polymer component.

As paraffins there are generally used solid paraffins, for example soft paraffins, hard paraffins obtained by the Fischer-Tropsch synthesis, paraffins obtained in the lignite extraction, mineral waxes and/or petroleum paraffins. The paraffins may have straight or branched chains. Polyolefins suitable for the manufacture of mixed chlorination products are, for example, solid or waxy low pressure or high pressure polyethylenes of varying molecular weights, solid or waxy polypropylenes or copolymers or mixtures thereof. The polyolefin component may be present, for example, in an amount of 2 to 30% by weight. The mixtures are suitably chlorinated to a content of 5 to 25% by weight of chlorine, which corresponds to a content of 1 chlorine atom per 10 to 50 carbon atoms, and advantageously to a chlorine content of 8 to 20% by weight (or conversely). Products having a relatively high chlorine content are advantageously used when the portion of polyolefin is small.

As aromatic components there may be used, for example, aromatic hydrocarbons except benzene or toluene, or phenols, that is to say, compounds having a molecular weight of at least 94, the molecular weight of phenol, for example xylene, diphenyl, naphthalene, cumene, cymene, tetrahydronaphthalene, anthracene, phenol, the two naphthols ($\alpha$ and $\beta$ naphthol), cresols, bi- or trifunctional xylenols, i.e. those in which at least two of the ortho- and/or para-positions are free, if desired in the form of commercial mixtures, products of such phenols which have been chlorinated in the nucleus or mixtures of the aforesaid substances with one another. The aromatic substances are used in an amount such that substantially all the chlorine is removed.

The condensation may be carried out at varying temperatures in the presence of a known Friedel-Crafts catalyst such as aluminum chloride, borofluoride, iron chloride or mixtures thereof, if desired in the presence of a solvent. As catalyst zinc dust or zinc chloride may be used with special advantage. The kind of processing depends on the nature of the substance; it may be advantageous, in special cases, to proceed in the presence of a solvent. In some cases it is of advantage to proceed as follows: when the reaction is finished the product is filtered under pressure and if a solvent has been used the latter is distilled off; the excess of phenol is removed by a steam distillation and the product is obtained in an anhydrous form by melting in vacuo. If somewhat discolored products are obtained they may be brightened by a subsequent hydrogenation. Moreover, processing is facilitated by the cyclohexanol obtained in the hydrogenation of the phenol in excess.

The compounds obtained by the process of the invention may be used as intermediate products, especially for the manufacture of waxy products, as non-exuding plasticizers of high molecular weight, as substances to be added to liquid or solid hydrocarbon mixtures or their derivatives in order to improve the properties thereof, and as coating materials for metallic or nonmetallic articles.

The reaction products obtained with the use of phenols may be used with special advantage in the manufacture of phenol resins. It has been found that the mechanical properties of phenol resins can be considerably improved when the resins are set in the presence of such reaction products. Since the alkyl groups of the said reaction products partially consist of polyolefin groups and are therefore of high molecular nature, the products differ fundamentally from the known analogous condensation products prepared from chlorinated paraffins. Instead of the aforesaid reaction products from mixed chlorination products and phenols, there may be used their condensation products with formaldehyde, acetaldehyde, furfural or mixtures of various aldehydes. The condensation may be carried out in known manner in an acid or alkaline medium. The process may be varied in a manner such that the mixture of phenol and modified alkyl phenols is condensed and hardened together with the aldehyde. The resins so obtained are still fusible. They are mixed with the novolak prepared from phenol, fillers and a hardener on a roller or kneader at an elevated temperature, for example 100° C. As fillers the known filling materials may be used, for example wood powder, stone powder, asbestos, carbon powder, barium sulfate and titanium dioxide. As hardeners there may be used the alkaline substances already known for this purpose, for example hexamethylene tetramine. The products so obtained are brittle substances which are easy to pulverize. They may be made into articles by moulding, for example at a temperature of 175° C. and a pressure of 200 atmospheres gage, and set. After setting, the products possess a considerably higher impact strength than the known phenol/aldehyde moulding materials. Their resistance to solvents, inorganic chemicals such as acids and lyes and to oil is not affected. Their mechanical workability is superior to that of the usual phenol resins and they can be very well sawed, ground, filed, drilled and milled. Especially good properties are obtained when the portion of polyolefin is within the range of 5 to 20%.

The following examples serve to illustrate the invention but they are not intended to limit it thereto.

*Example 1*

A mixture consisting of 90% of an aliphatic hydrocarbon melting at about 105° C. and 10% of low pressure polyethylene of a reduced viscosity of $\eta$ red.=1.8 was prepared as follows: the paraffin was melted and heated to 150° C.; the polyethylene was slowly introduced in portions into the hot melt while stirring vigorously; care was taken that before the addition of each portion the preceding portion had dissolved completely. After the addition and dissolution of the whole quantity of polyethylene, the temperature was allowed to drop to 130° C. and chlorine was introduced in a rapid current in a manner such that the temperature of the melt did not exceed 125 to 130° C. until the chlorine content of the melt amounted to 12%. Nitrogen was then blown through until all of the hydrogen chloride had been expelled.

300 grams of the mixed chlorination product obtained as described above were introduced into a flask and melted and then 300 grams of molten phenol were added. The melt was kept under nitrogen and heated to 130° C. on an oil bath, while stirring. 10 grams of zinc dust were slowly added in portions with vivid evolution of hydrogen chloride. The batch was stirred at 130° C. for a total of 8 hours. The product was then filtered under pressure or suction-filtered, the excess of phenol was removed by steam distillation and the water was eliminated by melting in vacuo while stirring. The end product contained 0.22% of chlorine and had a hydroxyl number of 136.1. The condensation product was obtained in a wax-like form and was very flexible. The melt was highly viscous.

The colour of the product was brightened by hydrogenation, the other physical properties remaining unchanged. The hydrogenated product was free from chlorine and had a hydroxyl number of 114.

In the table given below, the properties of the product of the invention are compared with those of a known product. The latter was prepared by chlorinating the same hard paraffin in the same manner as indicated above until the chlorine content amounted to 12% and the chlorinated product was then condensed with the same amount of phenol according to the Friedel-Crafts method as described above. The product had a hydroxyl number of 105 and was free from chlorine.

TABLE

|  | Without polyethylene | With polyethylene |
| --- | --- | --- |
| Stiffness in flexure | 440 | 1,000 |
| Flexural strength, grams | 225 | 615 |
| Tear resistance, kg./mm. | 8.6 | 21.4 |
| Penetrometer number | 25 | 10 |

*Example 2*

170 grams of a mixed chlorination product prepared as described in Example 1 were melted and introduced into molten naphthalene. The melt was heated to 130° C. in a weak nitrogen current, while stirring, and 10 grams of zinc dust were introduced in portions. The whole was heated at 130° C. for a further 16 hours in a weak nitrogen current, while stirring, and then filtered under pressure. The excess of naphthalene was removed by distillation with steam. By melting in vacuo with stirring, the water was removed and the anhydrous, waxy and flexible product was obtained. The product was cast into sheets. It had an iodine number of 34.9 and contained 0.9% of chlorine.

*Example 3*

600 grams of molten diphenyl were introduced into a melt of 300 grams of the mixed chlorination product of Example 1. The melt was heated to 130° C. on an oil bath in a weak nitrogen current, while stirring. 10 grams of zinc dust were then introduced in portions into the melt. The whole was heated at 130° C. for a further 48 hours. The product was then filtered under pressure, the excess of diphenyl was removed by distillation with steam and after melting in vacuo, the anhydrous product was obtained. The product was hard and very elastic. It had an iodine number of 44.5 and contained 0.83% of chlorine.

*Example 4*

A mixed chlorination product of 95% of paraffin melting at 105° C. and 5% of the low pressure polyethylene mentioned in Example 1 was prepared by the process described in Example 1. The mixed chlorination product was reacted with phenol as described in Example 1. The hard flexible anhydrous end product had a hydroxyl number of 128.1 and contained 0.03% of chlorine.

*Example 5*

In the manner described in Example 1, a mixture consisting of 90% of an aliphatic hydrocarbon melting at about 105° C. and 10% of a low pressure polypropylene having a reduced viscosity of $\eta$ red.=2.1 was prepared and chlorinated at 160° C. until the melt contained 12% of chlorine. Nitrogen was then blown through until all of the hydrogen chloride had been expelled. The mixed chlorination product so obtained was condensed with phenol as described in Example 1. The resulting compound constituted a plastic, very tacky mass. It contained 0.17% of chlorine and had a hydroxyl number of 133.7.

*Example 6*

A mixed chlorination product prepared according to Example 1 was reacted with penol in the manner described in Example 1 except that AlCl$_3$ was used as catalyst instead of zinc dust and that, prior to the filtration, the product was diluted with a diluent such as benezene, toluene or xylene, which was distilled off after the filtration.

The condensation product was cast into sheets. It had a high stiffness in flexure. The hydroxyl number amounted to 154.8 and the content of chlorine was 0.2%.

*Example 7*

According to the process described in Example 1, a mixture of 80% of a hydrocarbon melting at about 105° C. and 20% of polyethylene of a reduced viscosity of $\eta$ red.=1.8 was prepared at 160° C. and chlorinated at that temperature until the melt contained 12% of chlorine. Nitrogen was then blown through until all of the hydrogen chloride had been expelled. The mixed chlorination product so obtained was condensed with phenol as described in Example 1. The resulting compound was a wax-like, very flexible mass. It had a hydroxyl number of 113 and a chlorine content of 0.3%.

*Example 8*

A mixed chlorination product of 95% by weight of a Fischer-Tropsch paraffin melting at 105° C., 5% by weight of polyethylene of a reduced viscosity of $\eta$ red.=1.8 and 16% by weight of chlorine was prepared and reacted with phenol as described in Example 1. The end product had a hydroxyl number of 154.5 and a chlorine content of 0.14%.

The $\eta$ red. values used for characterizing the polyethylene or polypropylene used are defined as follows: $\eta$ red. is the reduced specific viscosity of 0.1 gram of polyethylene or polypropylene in 100 cc. of decahydronaphthalene at 135° C. The reduced specific viscosity is measured as follows: The ratio of the flowing time of a 0.1% solution of polyethylene or polypropylene in decahydronaphthalene to the flowing time of decahydronaphthalene, measured in an Ostwald viscosimeter, yields the relative viscosity $\eta$ rel. By subtracting 1 from $\eta$ rel. and dividing by the concentration 0.1, $\eta$ red. is obtained.

*Example 9*

Novolak-like resins were prepared by reacting modified alkyl phenols in known manner with formaldehyde. The resins were mixed at 100° C. on mixing rollers with a filler, the novolak from phenol and formaldehype, and hexamethylene tetramine as hardener. The mixture so obtained was a brittle mass which could be easily pulverized. The composition of the mixture and the strength of test specimens prepared therefrom by moulding are shown by the following comparison.

30 grams of a novolak-like resin obtained from the reaction product of a mixture of 85% of hard paraffin melting at 105° C. and 15% of polypropylene of a viscosity of $\eta$ red.=2.1, which mixture had been chlorinated to a chlorine content of 12%, and phenol, 60 grams of pure phenol-formaldehyde novolak, 10 grams of hexamethylene tetramine and 100 grams of wood powder were mixed at 100° C. mixing rollers. The mixture so obtained was moulded for 10 minutes at a temperature of 175° C. and a pressure f 200 atmospheres gage and hardened. The sheets so obtained were cut into rods 0.6 cm. wide and 0.4 cm. thick to determine the impact strength. The average value found for the impact strength was 6.8 cm. kg./cm².

60 grams of pure phenol-formaldehyde-novolak, 30 grams of a resin obtained from the reaction product of chlorinated hard paraffin melting at 105° C. and phenol, 100 grams of a filler and 10 grams of hexamethylene tetramine were mixed at 100° C. on mixing rollers. From the mixture so obtained test specimens were made in the manner described above to determine the impact strength. The average value found for the impact strength of the test specimens was only 2.1 cm. kg./cm.².

We claim:

1. Process for the manufacture of a solid flexible condensation product which comprises reacting at a temperature of about 130° C. for at least 8 hours (1) a chlorinated mixture of a solid paraffin hydrocarbon and a member selected from the group consisting of polyethylene, polypropylene and mixtures thereof, said member being present in an amount of 2–30% by weight of said mixture, said mixture containing 5–25% by weight of chlorine, with (2) a compound having a molecular weight of at least 94 and selected from the group consisting of aromatic hydrocarbons, phenols, cresols, bi- and trifunctional xylenols and naphthols, said compound being used in an amount such that substantially all the chlorine is removed, in the presence of a catalyst selected from the group consisting of Friedel-Crafts catalyst and zinc powder used in a catalytic amount.

2. The process of claim 1, wherein chlorinated mixtures of hard paraffins obtained by the Fischer-Tropsch synthesis and solid low pressure polyethylene are used as chlorinated mixtures of paraffin hydrocarbons and polyolefins.

3. The process of claim 1, wherein chlorinated mixtures of petroleum paraffins and solid low pressure polyethylene are used as chlorinated mixtures of paraffin hydrocarbons and polyolefins.

4. The process of claim 1, wherein chlorinated mixtures of hard paraffins obtained by the Fischer-Tropsch synthesis and waxy low pressure polyethylene are used as chlorinated mixtures of paraffin hydrocarbons and polyolefins.

5. The process of claim 1, wherein chlorinated mixtures of petroleum paraffins and waxy low pressure polyethylene are used as chlorinated mixtures of paraffin hydrocarbons and polyolefins.

6. The process of claim 1, wherein chlorinated mixtures of hard paraffins obtained by the Fischer-Tropsch synthesis and solid high pressure polyethylene are used as chlorinated mixtures of paraffin hydrocarbons and polyolefins.

7. The process of claim 1, wherein chlorinated mixtures of petroleum paraffins and solid high pressure polyethylene are used as chlorinated mixtures of paraffin hydrocarbons and polyolefins.

8. The process of claim 1, wherein chlorinated mixtures of hard paraffins obtained by the Fischer-Tropsch synthesis and waxy high pressure polyethylene are used as chlorinated mixtures of paraffin hydrocarbons and polyolefins.

9. The process of claim 1, wherein chlorinated mixtures of petroleum paraffins and waxy high pressure polyethylene are used as chlorinated mixtures of paraffin hydrocarbons and polyolefins.

10. The process of claim 1, wherein the compound having a molecular weight of at least 94 is naphthalene.

11. The process of claim 1, wherein the compound having a molecular weight of at least 94 is diphenyl.

12. The process of claim 1, wherein the compound having a molecular weight of at least 94 is phenol.

13. The process of claim 1, wherein the compound having a molecular weight of at least 94 is α-naphthol.

14. The process of claim 1, wherein the compound having a molecular weight of at least 94 is β-naphthol.

15. A solid flexible condensation product obtained by reacting at a temperature of about 130° C. for at least 8 hours (1) a chlorinated mixture of a solid paraffin hydrocarbon and a member selected from the group consisting of polyethylene, polypropylene and mixtures thereof, said member being present in an amount of 2–30% by weight of said mixture, said mixture containing 5–25% by weight of chlorine, with (2) a compound having a molecular weight of at least 94 and selected from the group consisting of aromatic hydrocarbons, phenols, cresols, bi- and trifunctional xylenols and napthols, said compound being used in an amount such that substantially all the chlorine is removed, in the presence of a Friedel-Crafts catalyst used in a catalytic amount.

(References on following page)

References Cited by the Examiner

UNITED STATES PATENTS

| | | | |
|---|---|---|---|
| 1,892,990 | 1/1933 | Linner | 260—624 |
| 2,339,493 | 1/1944 | Lieber | 260—61 |
| 2,472,495 | 6/1949 | Sparks et al. | 260—28.5 |
| 2,525,024 | 10/1950 | Feil | 260—671 |
| 2,530,772 | 11/1950 | Johnson et al. | 260—62 |
| 2,743,304 | 4/1956 | Sharrah | 260—671 |
| 2,810,769 | 10/1957 | Sanford et al. | 260—671 |
| 2,831,040 | 4/1958 | Roh et al. | 260—671 |

OTHER REFERENCES

Raff et al.: Polyethylene, 1956, Interscience Publishers, Inc., N. Y., pp. 39–40, 104.

Warth: The Chemistry & Technology of Waxes, 2nd edition, 1956, Reinhold Publishing Corp., N. Y., pp. 450–453, 465–467.

MORRIS LIEBMAN, *Primary Examiner.*

ALLAN BOETTCHER, MILTON STERMAN,
*Examiners.*